(No Model)
J. REDFERN.
AIR BRAKE HOSE COUPLING.
No. 584,705.　　　　　　　　Patented June 15, 1897.
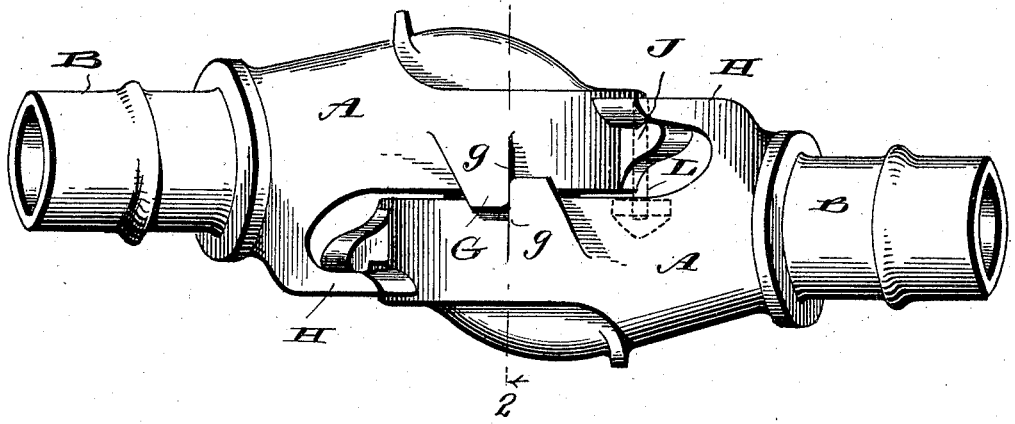
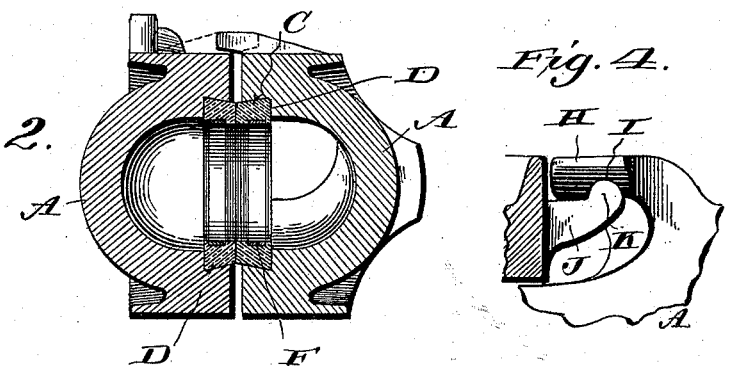
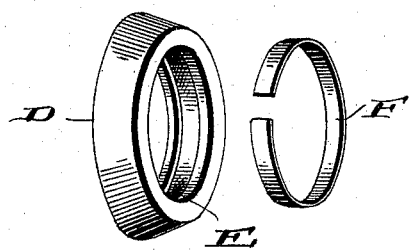
Witnesses:
L. C. Hills
E. H. Bond
Inventor:
Joseph Redfern,
by E. B. Stocking
Atty.

UNITED STATES PATENT OFFICE.

JOSEPH REDFERN, OF WILMERDING, PENNSYLVANIA.

AIR-BRAKE HOSE-COUPLING.

SPECIFICATION forming part of Letters Patent No. 584,705, dated June 15, 1897.

Application filed January 16, 1897. Serial No. 619,407. (No model.)

*To all whom it may concern:*

Be it known that I, JOSEPH REDFERN, a citizen of the United States, residing at Wilmerding, in the county of Allegheny, State of Pennsylvania, have invented certain new and useful Improvements in Air-Brake Hose-Couplings, of which the following is a specification, reference being had therein to the accompanying drawings.

This invention relates to certain new and useful improvements in air-brake hose-couplings; and it has for its objects, among others, to provide a simplified and cheapened construction, one that dispenses with several steps in the process of manufacture by which not only the cost of production is materially lessened, but the coupling rendered more durable and efficient in use. I dispense with the necessity of forming a groove in the inner wall of the outer end or mouth of the coupling, permitting of the more ready insertion and removal of the gasket when desired. I form the end or mouth of the coupling with an annular (preferably undercut) recess or socket, in which is placed the gasket, which latter is retained in position by means of a flat spring, which preferably fits in an annular groove in the gasket, serving to hold the latter firmly in position, so it cannot possibly be accidentally removed, but permitting of its ready removal, when desired, by proper manipulation. I form each coupling with a lug, which extends past the face of the coupling, so that when the two couplings are engaged the two straight edges of the lugs will come together and form a perfect stop. This does away with the necessity of tools and labor necessary to accomplish the desired end in the old construction, which necessitated drilling and pinning. I also avoid the necessity of the employment of yokes and screws heretofore employed in this form of coupling. The inside or under face of the wing is faced and grooved upon a circle struck from the center of the coupling-face, and a bead is milled or otherwise formed on the reclining lip that corresponds with and fits in said groove on the wing. The gasket in each coupling projects slightly above the face of the coupling, and when the couplings are placed in position and given the necessary rotary movement in order to couple the same considerable friction is caused between the reclining lip and the wing and the joint is thus formed. The lugs perform no function in making the joint, but serve effectually as a stop to prevent too great a movement.

My improved coupling will serve effectually in connection with the old form, in which a pin is employed at right angles to the length of the coupling, as is herein illustrated.

Other objects and advantages of the invention will hereinafter appear in the following description, and the novel features thereof will be particularly pointed out in the appended claims.

The invention is clearly illustrated in the accompanying drawings, which, with the letters of reference marked thereon, form a part of this specification, and in which—

Figure 1 is an elevation showing two of the couplers in their coupled position. Fig. 2 is a vertical section on the line 2 2 of Fig. 1, looking in the direction of the arrow. Fig. 3 is a perspective view of the gasket and its spring-ring removed and the two parts separated, and Fig. 4 is a detail showing the engaging rib and groove of the lip and wing.

Like letters of reference indicate like parts throughout the several views.

Referring now to the details of the drawings by letter, A designates the body portion of the coupling of ordinary form in its general contour and provided with the nipple or extension B for connection with the rubber hose or flexible tubing. (Not shown.) The face portion of this coupling is formed with an annular recess or socket C, having undercut walls, as shown in Fig. 2, and into this socket is designed to be fitted the gasket D or packing-ring, of rubber, asbestos, or any suitable material, the outer wall of which is correspondingly beveled, and its inner wall may or may not be provided with an annular groove or depression E, as seen best in Fig. 3.

F is a split ring, preferably of flat spring material, adapted to be placed within the gasket or packing-ring, as illustrated, and when the groove or depression E is present the said ring will be fitted into said groove or depression, as is illustrated in Fig. 2. The gasket or ring is of such thickness as to have its outer face project beyond the face of the casting or coupling body, as illustrated in Fig. 2, so that when the two couplings are united or coupled, as illustrated, the abutting faces of the two gaskets or rings will insure a perfectly water and air tight joint. The tendency of the spring is to expand itself continually, and when placing the gasket in position the said gasket is first placed within the socket or depression in the coupling and then the ring sprung together, so that its two ends will meet or approach each other when it is fitted into the recess or groove in the gasket; or the spring may be placed in the gasket before the latter is placed in position and then the spring grasped between the thumb and finger and sprung together until the ends overlie each other enough to permit of the gasket being sprung into position. When in position, the ring spreads itself and holds the gasket firmly in position and the two ends of the ring practically come squarely together, and being body-bound by the gasket become virtually a solid ring. The ends coming squarely together prevent its coming out. As it has a constant tendency to spread, the gasket cannot be accidentally forced out of its socket. The gasket may be readily removed by springing one end of the spring-ring out of place and prying it upward or downward when the new gasket is placed in the coupling and the same spring can be used. It requires no tools other than the finger and thumb, and, besides, the necessity of grooving the inner wall of the coupling to form the seat for the gasket is obviated.

The body portion of the coupling is formed with a lug G, projecting parallel with the opening in the body portion of the coupling and extending beyond the face thereof, having a square or straight side $g$, as seen best in Fig. 1. There is of course a lug on each coupling, it being preferably cast integral therewith, as illustrated, and placed precisely in the same place on each coupling, thus making them all uniform, and by reason of the straight face being at a right angle to the face of the coupling when the two couplings are engaged the two straight edges of the lugs come together and form a perfect lock and prevent movement of the parts in the direction of movement given them to couple them.

Each coupling-body is formed with the wing H, the inside face or wall of which is faced and grooved on a circle struck from the center of the coupling-face, said groove being seen best in Fig. 4 and designated by the letter I, while the reclining lip J is formed with a bead or projection K, formed upon a corresponding curve and adapted to engage in and fit said groove, as clearly illustrated in Figs. 1 and 4. As the gaskets project beyond the faces of the coupling when the latter are given a partial rotary movement, considerable friction is caused between the reclining lip and the wing, and thus the joint is formed. The lips entering the grooves serve to prevent any endwise movement until after the parts have been given the necessary rotary movement to couple or uncouple them.

The advantages of a coupling constructed in accordance with my invention, as hereinbefore described, will be manifest and will be appreciated by those skilled in the art. The presence of the features hereinbefore dwelt upon do not prevent the employment of the coupling in connection with the air-brake hose-coupling now in general use. In Fig. 1 I have indicated the interlocking of the same with a coupling having the ordinary pin, as indicated by dotted lines at L.

Modifications in detail may be resorted to without departing from the spirit of the invention or sacrificing any of its advantages.

The rounded bead or projection on the reclining lip is so disposed relatively to the groove of said lip that in case of accident, as a break in the train, as will sometimes occur on a heavy grade, the couplings will separate by abnormal longitudinal strain thereon, the beads on the lip passing over the outer walls of the grooves in the wings, and thus avoid injury to the couplings, such as results from the use of such couplings as require a partial rotary movement in order to uncouple or disconnect the same. In my construction the parts are so disposed that in normal conditions separation of the couplings by the longitudinal strain cannot take place.

Having thus described my invention, what I claim as new, and desire to secure by Letters Patent of the United States, is—

1. A coupling of the class described, provided with a lug extending at an angle to the face of the coupling and projecting beyond the same and having a square face at right angles to the face of the coupling located at such a point as to abut against a similar lug upon an adjacent coupling, substantially as described.

2. A coupling of the class described, provided with a wing having a groove upon its under face concentric with the opening in said face, a reclining lip diametrically oppositely disposed and having a rib on its outer face concentric with the opening in the face of the coupling, and a lug between the wing and lip and projecting at right angles to the face and extending beyond the same; substantially as described.

3. A gasket for an air-brake hose-coupling, the same having a tapered outer wall, an annular depression upon its inner wall, and a split spring-ring adapted to be seated in said depression; substantially as described.

4. The combination with the coupling having an annular socket with undercut wall, of a gasket having a correspondingly beveled outer wall fitting said socket and projecting beyond the face of the coupling, and provided upon its inner wall with an annular depression, and a split spring-ring seated in said depression; as set forth.

In testimony whereof I affix my signature in presence of two witnesses.

JOSEPH REDFERN.

Witnesses:
  HENRY W. WILLIAMS,
  ALBERT J. EDWARDS.